(12) United States Patent
Mikoshiba et al.

(10) Patent No.: US 10,917,665 B2
(45) Date of Patent: Feb. 9, 2021

(54) SERVER DEVICE, AND STORAGE MEDIUM USED IN SAME

(71) Applicant: KONAMI DIGITAL ENTERTAINMENT CO., LTD., Tokyo (JP)

(72) Inventors: Eiri Mikoshiba, Tokyo (JP); Kenichi Kataoka, Tokyo (JP); Kazunari Sarugaku, Tokyo (JP); Mitsuru Tamagawa, Tokyo (JP)

(73) Assignee: KONAMI DIGITAL ENTERTAINMENT CO., LTD., Tokyo (JP)

(*) Notice: Subject to any disclaimer, the term of this patent is extended or adjusted under 35 U.S.C. 154(b) by 0 days.

(21) Appl. No.: 16/570,427

(22) Filed: Sep. 13, 2019

(65) Prior Publication Data

US 2020/0007900 A1 Jan. 2, 2020

Related U.S. Application Data

(63) Continuation of application No. PCT/JP2018/007576, filed on Mar. 6, 2018.

(30) Foreign Application Priority Data

Mar. 15, 2017 (JP) .................. 2017-050300

(51) Int. Cl.
*H04L 12/00* (2006.01)
*H04N 21/218* (2011.01)
(Continued)

(52) U.S. Cl.
CPC ......... *H04N 21/2181* (2013.01); *A63F 13/60* (2014.09); *A63F 13/85* (2014.09);
(Continued)

(58) Field of Classification Search
CPC .... A63F 13/85; A63F 2300/206; A63F 13/35; A63F 13/56; A63F 13/79; A63F 13/60;
(Continued)

(56) References Cited

U.S. PATENT DOCUMENTS 5,685,775 A * 11/1997 Bakoglu .................. A63F 13/12
463/41
7,428,638 B1 * 9/2008 Chen ....................... A63F 13/12
713/168
(Continued)

FOREIGN PATENT DOCUMENTS

JP 2012-34792 A 2/2012
JP 2012-38042 A 2/2012
(Continued)

OTHER PUBLICATIONS

International Search Report dated Apr. 10, 2018 issued by the International Searching Authority in corresponding International Application No. PCT/JP2018/008576.
(Continued)

*Primary Examiner* — Frantz Coby
(74) *Attorney, Agent, or Firm* — Sughrue Mion, PLLC

(57) ABSTRACT

Provided is a server device capable of further promoting provision of videos. A center server stores video data to be distributed to user terminals connected via a network and distributes video data in response to a request from a user terminal. The center server also manages the video data so that a user ID and a video ID are associated and recorded and, when an additional condition including the viewing of individual videos as a requirement is satisfied, uses the video data as a basis to specify a first user corresponding via user ID to a video viewed through a user terminal in order to satisfy the additional requirement. Furthermore, when a user terminal additionally functions as a game terminal for providing a game, the center server provides additional infor-
(Continued)

mation to the first user for adding a game change to the game.

5 Claims, 9 Drawing Sheets

(51) Int. Cl.
*A63F 13/60* (2014.01)
*A63F 13/85* (2014.01)
*H04N 21/258* (2011.01)

(52) U.S. Cl.
CPC . *H04N 21/25816* (2013.01); *H04N 21/25875* (2013.01); *H04N 21/25891* (2013.01); *A63F 2300/206* (2013.01)

(58) Field of Classification Search
CPC ..... A63F 13/48; A63F 13/69; H04N 21/2181; H04N 21/47202; H04N 21/4781; H04N 21/25875; H04N 21/25891; H04N 21/25816; G06Q 30/06; G06F 13/00
USPC .............. 709/219, 203, 227, 239, 217, 218; 463/31, 42
See application file for complete search history.

(56) References Cited

U.S. PATENT DOCUMENTS

| | | | | |
|---|---|---|---|---|
| 7,711,847 B2* | 5/2010 | Dhupelia | ............ | H04L 67/1002 709/239 |
| 7,914,381 B2* | 3/2011 | Blythe | ................. | A63F 13/795 463/42 |
| 7,962,549 B2* | 6/2011 | Dhupelia | .............. | A63F 13/352 709/203 |
| 8,070,603 B2* | 12/2011 | Itakura | .................... | H04L 67/38 463/42 |
| 8,556,715 B2* | 10/2013 | Archer | .................... | A63F 13/79 463/31 |
| 8,613,674 B2* | 12/2013 | Vago | ..................... | A63F 13/323 463/42 |
| 9,384,442 B2* | 7/2016 | Lee | ........................ | G06N 3/006 |
| 2003/0037149 A1* | 2/2003 | Hess | ...................... | G06Q 30/06 709/227 |
| 2003/0130040 A1* | 7/2003 | Dripps | .................... | A63F 13/31 463/42 |
| 2006/0287099 A1* | 12/2006 | Shaw | ...................... | H04L 67/14 463/42 |
| 2013/0130794 A1* | 5/2013 | Oshima | .................. | A63F 13/87 463/31 |
| 2013/0165234 A1* | 6/2013 | Hall | ........................ | A63F 13/00 463/42 |
| 2014/0380197 A1* | 12/2014 | Baszucki | ................ | H04L 43/16 715/757 |
| 2015/0038234 A1* | 2/2015 | Bojorquez | ............ | A63F 13/358 463/42 |
| 2016/0225224 A1* | 8/2016 | Nguyen | .............. | G07F 17/3225 |
| 2016/0287987 A1* | 10/2016 | Onda | ...................... | A63F 13/86 |

FOREIGN PATENT DOCUMENTS

| | | |
|---|---|---|
| JP | 2015-16104 A | 1/2015 |
| JP | 2015-198404 A | 11/2015 |
| JP | 2016-189802 A | 11/2016 |
| JP | 2016-198329 A | 12/2016 |
| WO | 2016/163274 A1 | 10/2016 |

OTHER PUBLICATIONS

Written Opinion dated Apr. 10, 2018 issued by the International Searching Authority in corresponding International Application No. PCT/JP2018/008576.
Notice of Reasons for Refusal dated Jul. 14, 2017 issued by the Japanese Patent Office in counterpart application No. 2017-050300.
Decision to Grant a Patent dated Nov. 13, 2017 issued by the Japanese Patent Office in counterpart application No. 2017-050300.
Notice of Reasons for Refusal dated Jul. 20, 2017 issued by the Japanese Patent Office in application No. 2017-050287.
Notice of Reasons for Refusal dated Nov. 14, 2017 issued by the Japanese Patent Office in application No. 2017-050287.
Notice of Reasons for Refusal dated Mar. 12, 2018 issued by the Japanese Patent Office in application No. 2017-050287.
Decision to Grant a Patent dated Aug. 1, 2018 issued by the Japanese Patent Office in application No. 2017-050287.

* cited by examiner

SERVER DEVICE, AND STORAGE MEDIUM USED IN SAME

TECHNICAL FIELD

The present invention relates to a server device or the like that includes a distribution data storage unit that stores data for distribution to be distributed to a requesting terminal connected via a network, and that distributes the data for distribution to the requesting terminal according to a request from the requesting terminal.

BACKGROUND ART

There is a per se known server device that includes a distribution data storage unit that stores data for distribution to be distributed to a requesting terminal connected via a network, and that distributes the data for distribution to the requesting terminal according to a request from the requesting terminal. For example, an information processing system is per se known in which video data for displaying video and a game terminal that provide a game are respectively employed as data for distribution and as a requesting terminal of the above type (for example, refer to PTL1).

CITATION LIST

Patent Literature

PTL1: JP2015-198404A.

SUMMARY OF INVENTION

Technical Problem

With the system of PTL1, a video corresponding to events of a game in progress is retrieved from among a plurality of videos that are subjects for distribution, and is distributed. And the user advances the game while referring to information of this sort. However, with the system of PTL1, the viewing of the video does not exert any direct influence upon the progression of the game. For this reason, there is room for further promoting the viewing of videos and the provision of videos.

Accordingly, it is an object of the present invention to provide a server device and so on, capable of further promoting provision of videos.

Solution to Technical Problem

The server device of the present invention is a server device that comprises a computer having a distribution data storage unit that stores data for distribution to be distributed to a requesting terminal connected via a network, and that distributes the data for distribution to the requesting terminal according to a request from the requesting terminal, and wherein the computer serves as: a management data storage unit that, when the requesting terminal includes a video display terminal that is employed for displaying videos so that video data for displaying videos functions as the data for distribution, stores video management data in which user identification information for identifying individual users and video identification information for identifying videos are described in mutual association; a user specification unit that, if an additional condition that includes a requirement for viewing a video is satisfied, specifies, on the basis of the video management data, a corresponding user who corresponds via the user identification information to a video that has been viewed via the video display terminal due to the additional condition having being satisfied; and an information provision unit that, when the requesting terminal includes a game terminal that provides a game, provides to the corresponding user, additional information for adding a game change to the game, on the basis of the result of specification by the user specification unit.

On the other hand, the non-transitory computer readable storage medium of the present invention is a non-transitory computer readable storage medium storing a computer program that is adapted to cause the computer having the distribution data storage unit and the management data storage unit to function as the units of the server device described above.

DESCRIPTION OF EMBODIMENTS

Figure 1:
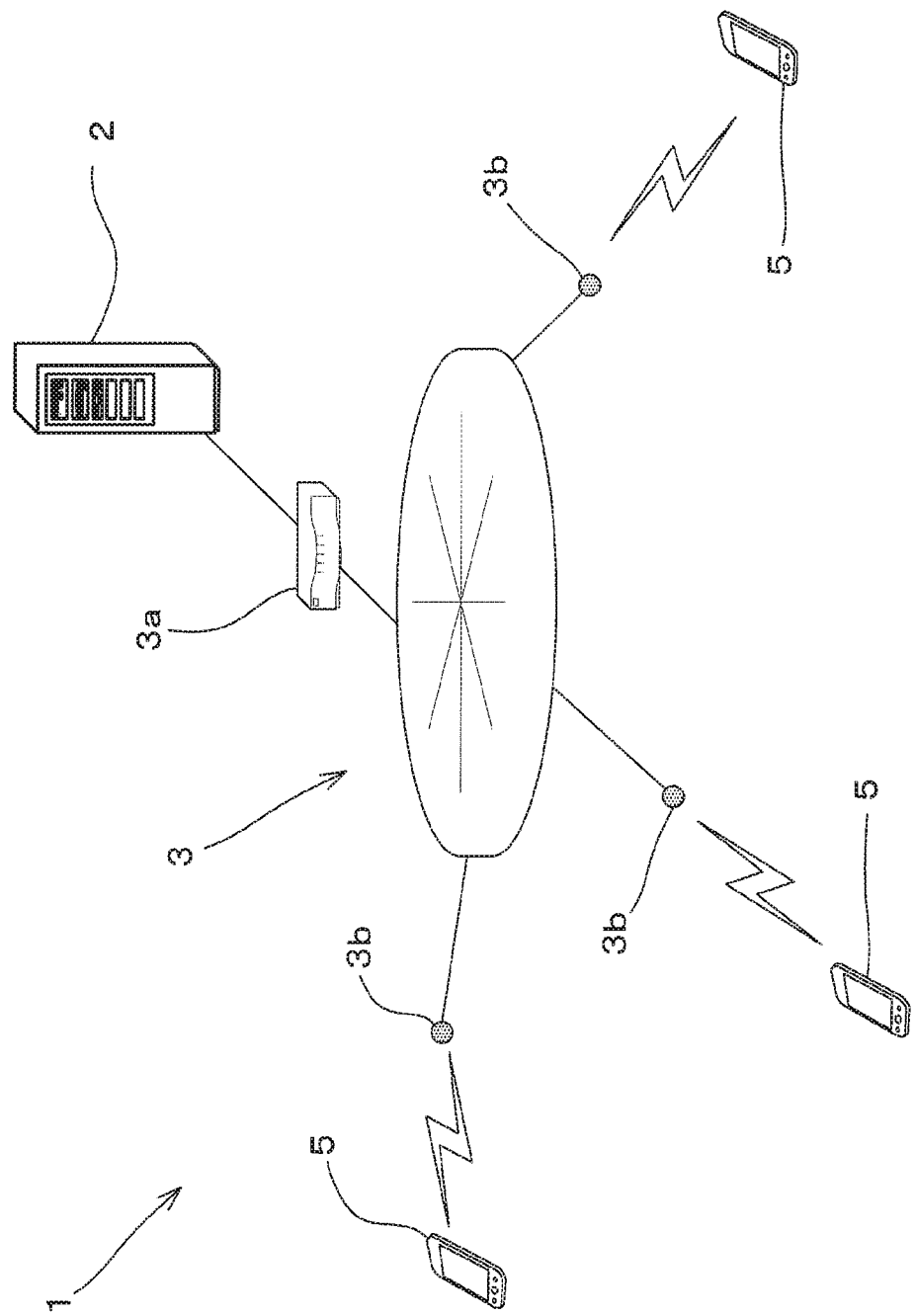
FIG. 1 is a figure showing a summary of the overall structure of a video distribution system according to an embodiment of the present invention.

A video distribution system according to an embodiment of the present invention will now be explained in the following. FIG. 1 is a figure showing a summary of the overall structure of the video distribution system according to an embodiment of the present invention. As shown in FIG. 1, the video distribution system 1 includes a central server 2, which functions as a server device. The central server 2 is not restricted to being an example that is built from a single physical device. For example, a single logical central server 2 may be built from a server group that consists of a plurality of physical devices. Moreover, a logical central server 2 may be built by employing cloud computing.

User terminals 5 are connected to the central server 2 via a network 3. The user terminals 5 are network terminal device of types employed by users. For example, portable telephones (including smart phones) may be employed as the user terminals 5. And, portable telephones are one type of user terminal via which applications are provided to individual users. The user terminals 5 may, for example, function as requesting terminals that request web services to be described hereinafter from the central server 2 via the network 3. For example, a portable telephone may have a video replay function of displaying (i.e. reproducing) videos. And, for example, a portable telephone may function as a video display terminal for displaying videos via this type of video replay function. Moreover, a portable telephone may provide functions of various other types by executing software. For example, a game machine function of enabling the user to play a game may be included in functions of this type. And, for example, a portable telephone may function as a game terminal that provides a game via this type of game machine function. In other words, the user terminals 5 may, for example, function both as video display terminals and as game terminals. Incidentally, apart from the above, network terminal devices of various types that can be connected to the network and that provide individual applications to users may be employed as user terminals 5, such as, for example, personal computers or portable type tablet terminal devices.

As one example, the network 3 may be built by implementing network communication that employs the TCP/IP protocol. Typically, the network 3 is built as a combination of the internet that serves as a WAN and an intranet that serves as a LAN. In the example of FIG. 1, the central server 2 is connected to the network 3 via a router 3a, and each of the user terminals 5 is connected to the network 3 via an access point 3b.

Incidentally, the network 3 is not restricted to being of a type that employs the TCP/IP protocol. Various formats that use cable circuits or wireless circuits or the like for communication (including infrared communication and Near Field communication and so on) may be employed for the network 3.

Via the network 3, the central server 2 provides web services of various kinds to the users of the user terminals 5. Such web services include a video distribution service for distributing videos to the user terminals 5. The details of the video distribution service will be described hereinafter.

Incidentally, the web services may include other services of various types corresponding to various functions of the user terminals 5. For example, the web services may include an information service for providing information of various kinds related to videos or to games. Moreover, for example, the web services may also include distribution services for distributing data or software of various kinds to the individual user terminals 5 (including data updates and so on). Furthermore, the web services may also include a community service of providing an information exchange forum for transmission, exchange, and sharing of information by users, a service of providing user IDs for identifying individual users, a matching service of matching users together when a plurality of users play a game in common via the network 3, and so on.

Figure 2:
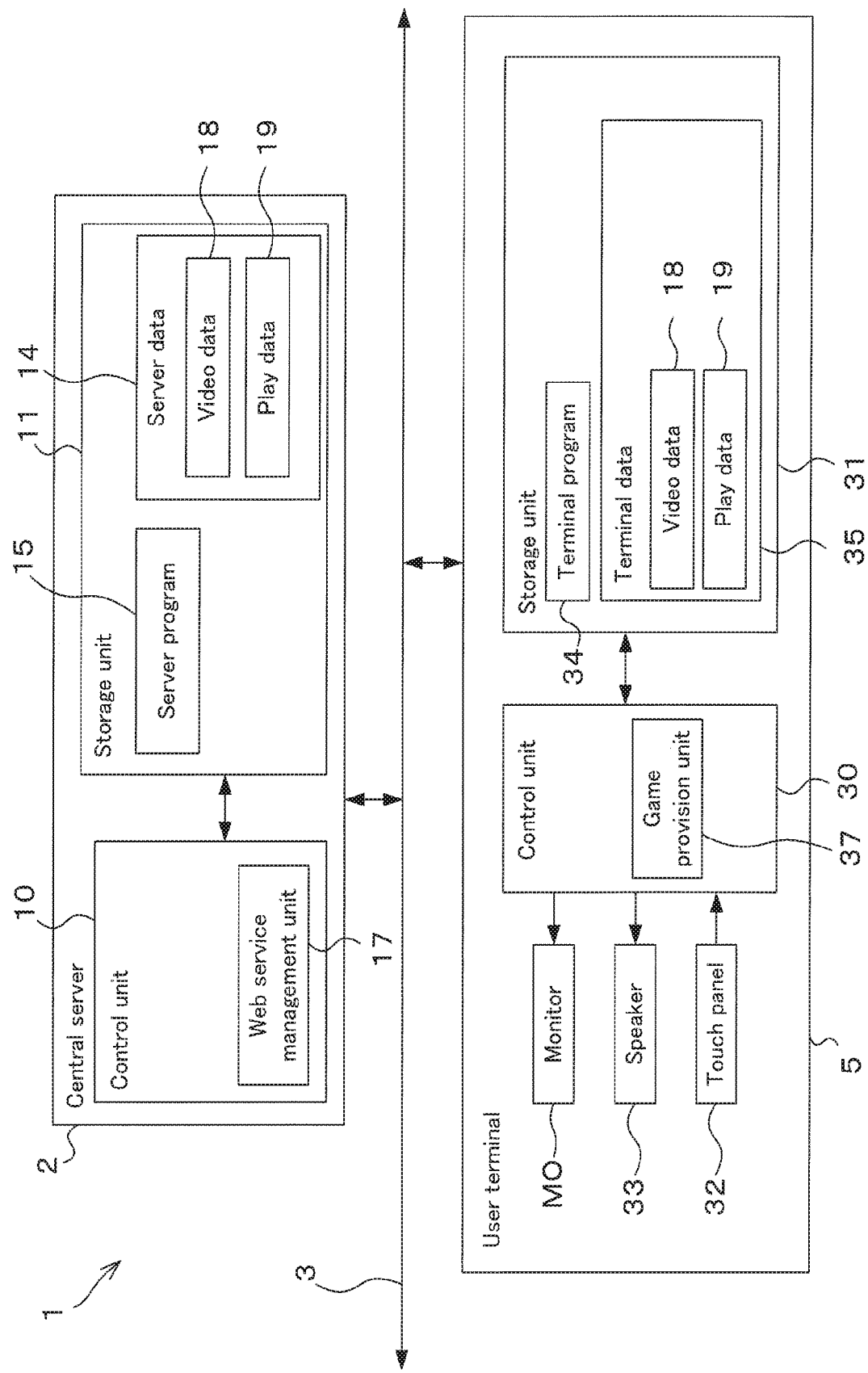
FIG. 2 is a figure showing the structure of principal portions of a control system of the video distribution system.

Next, principal portions of a control system of the video distribution system 1 for providing a game will be explained. FIG. 2 is a figure showing the structure of principal portions of the control system of the video distribution system 1. As shown in FIG. 2, the central server 2 includes a control unit 10 which serves as a computer, and a storage unit 11. The control unit 10 is built as a computer unit in which a microprocessor and various peripheral devices such as internal storage devices required for the operation of the microprocessor (such as, for example, ROM and RAM) and so on are combined. Incidentally, input devices such as a keyboard and so on, and output devices such as a monitor and so on, may be connected to the control unit 10. However, these are not shown in the figures.

The storage unit 11 is connected to the control unit 10. The storage unit 11 may be adapted to be capable of maintaining storage even when power is not supplied thereto; for example, it may be built around a high capacity storage medium such as a magnetic tape or the like. Server data 14 and a server program 15 are stored in the storage unit 11. The server program 15 is a computer program that is required for the central server 2 to provide services of various types to the user terminals 5. By the control unit 10 reading in and executing the server program 15, a web service management unit 17 is provided interior to the control unit 10.

The web service management unit 17 executes processing required for providing the web services mentioned above. The web service management unit 17 is a logical device that is implemented by a combination of computer hardware and a computer program. Incidentally, apart from the above, other logical devices of various types may also be provided internally to the control unit 10. However, these are not shown in the figures.

The server data 14 is data that is referred to while the server program 15 is being executed. For example, the server data 14 may include video data 18 and play data 19. Video data 18 is data for displaying video of various types. For example, this type of video may include a video relating to a game (in the following, this is sometimes termed a "game video"). In more concrete terms, the video data 18 may, for example, include data for displaying, as a video, game screen transitions during playing of a game from the past. Moreover, the play data 19 is data for managing specific information that is intrinsic to individual users. For example, this type of specific information may include information about activity results related to games of individual users. And, for example, the play data 19 may be used for carrying forward play results from previous sessions (i.e. situations from past play) to the next session and to subsequent sessions, or for carrying setting details that are unique to each user. The details of the video data 18 and of the play data 19 will be described in detail hereinafter.

Incidentally, apart from the above, the server data 14 may, for example, include data of various types for web services, such as ID management data for managing IDs of various types such as user IDs and so on. However, this is not shown in the figure.

On the other hand, each of the user terminals 5 is provided with a control unit 30, a storage unit 31, a monitor MO, a touch panel 32, and a speaker 33. The storage unit 31, the monitor MO, the touch panel 32, and the speaker 33 are all connected to the control unit 30. The control unit 30 is built as a computer unit in which a microprocessor and various peripheral devices such as internal storage devices required for the operation of the microprocessor (such as, for example, ROM and RAM) and so on are combined. Incidentally, for example, apart from the above, devices of various types that are required for replaying videos or providing games or the like may be connected to the control unit 30. However, these are not shown in the figures.

The monitor MO is a per se known display device for displaying images and so on of various types on the basis of output signals from the control unit 30. As one example, the monitor MO may display videos and game screens for playing games according to output signals from the control unit 30. The touch panel 32 is a per se known input device that, when touched by the user with a finger or the like, outputs a signal corresponding to the position of contact. For example, the touch panel 32 may be built to be transparent, and may be disposed by being overlaid upon the front surface of the monitor MO. And for example, on the basis of touch operation by the user, the touch panel 32 may output a signal to the control unit 30 corresponding to the touched position. In a similar manner, the speaker 33 is a per se known output device (i.e. an audio reproduction device) for replaying audio of various types on the basis of output signals from the control unit 30. According to output signals from the control unit 30, the speaker 33 may, for example, replay audio of various types such as BGM (background music) and so on employed in videos or games.

On the other hand, the storage unit 31 may be built so as to be capable of maintaining storage even if power is not supplied thereto, for example around a magnetic recording medium or an optical recording medium or a flash SSD (Solid State Drive) or the like. A terminal program 34 and terminal data 35 are stored in the storage unit 31. The terminal program 34 is a computer program that is required for the user terminal 5 to provide services of various types. For example, replaying of videos and provision of games may be included in services of these types. Along with execution of the terminal program 34, a game provision unit 37 is provided internally to the control unit 30. The game provision unit 37 executes processing of various types required for providing services, such as replaying of videos and playing of games and so on. The game provision unit 37 is a logical device that is implemented by a combination of computer hardware and a computer program. Incidentally, apart from the above, other logical devices of various types may also be provided internally to the control unit 30. However, these are not shown in the figures.

The terminal data 35 is data that is referred to while the terminal program 34 is being executed. For example, the terminal data 35 may include video data 18 and play data 19. For example, at least a part of this data may be provided from the central server 2, with a required portion being included. Incidentally, apart from the above, the terminal data 35 may, for example, include data of various types for performing other services of various types. For example, audio data for replaying audio of various types such as BGM and so on required for videos or games, image data for displaying images of various types required for games, and the ID management data described above, may be included in data of this type. However, these are not shown in the figures. Moreover for example, by being distributed to the user terminals 5, the video data 18 and the play data 19 may function as the data for distribution of the present invention.

Next, the details of the video distribution service provided by the video distribution system 1 will be explained. As mentioned above, the video distribution service is a service for distributing videos to the user terminals 5. For example, a video that is to be distributed may be uploaded from a user terminal 5 to the central server 2 via the network 3. In other words, video data 18 for replaying a video that is to be distributed may be provided from a user terminal 5. And the video distribution service may include uploading of this type of video data 18. Furthermore, for example, if an additional condition that includes viewing a video in the requirements is satisfied, then the video distribution service may include a service that adds a change (sometimes hereinafter referred to as a "game change") to the game of the user associated with a video viewed via the user terminal 5 in order to satisfy this additional condition. Moreover, for example, the users may be associated with providers of videos (i.e. with users who have uploaded the videos) via the video data 18. In other words, for example, the video distribution service may be adapted, if an additional condition is satisfied via the viewing of a video, to add a game change to a game that is being played by the user who has uploaded that video. Furthermore, if a change condition that includes viewing each video in requirements is satisfied, then the video distribution service may implement a change (hereinafter this is sometimes termed a "terminal change") to a game of the user who has viewed that video via his user terminal 5 in order to satisfy that change condition.

For example, awarding benefits of various types (such as points and so on that advantageously contribute to the progression of the game, or unusual ornaments or the like) or giving opportunities for setting associations corresponding to users (for example, registrations of friends or rivals or the like) and so on may be employed as game changes. Furthermore, for example, additional conditions may be satisfied along with viewing, or may be satisfied on the basis of information that is specific to the user who has viewed each video. For example, an activity record related to the game may be employed as this type of specific information. In concrete terms, for example, the additional condition may employ a playing record of a game as an activity record, and may be satisfied when the game video has been viewed by a user having a playing record of that game. Or the additional condition may include an association setting in its requirements.

Moreover, changes of various types associated with services of various types provided by the user terminals 5 may be employed as terminal changes. For example, a terminal change may be a change related to a video replay function provided by a web browser, or may be a change related to a game machine function provided by a game application. In other words a terminal change may, for example, be a change related to viewing of a video, such as a change related to conferring a benefit of some type associated with the viewing of a video (such as benefits like awarding points that give advantages to viewing of a video, or unusual ornaments or the like), or a change that gives an opportunity for a related setting. Alternatively, a terminal change may be a game-related change, such as, for example, conferring a game-related benefit of any of various types, or conferring an opportunity for an association setting. Furthermore, for example, in a similar manner to the case for an additional condition, a change condition may be satisfied by viewing each video, or may be satisfied on the basis of a specific condition. Even further, a change condition may include an association setting in its requirements.

In this manner, for example, the video distribution service may be adapted, when each video is viewed, to confer a benefit to the game of the user who provided that video, or to confer an opportunity for an association setting when each game video is viewed by a user who has a record playing of that game. Furthermore, for example, when a game video has been viewed by a user who has a playing record of that game, the video distribution service may confer a benefit, or may confer an opportunity for an association setting to that user who has viewed the video.

Figure 3:
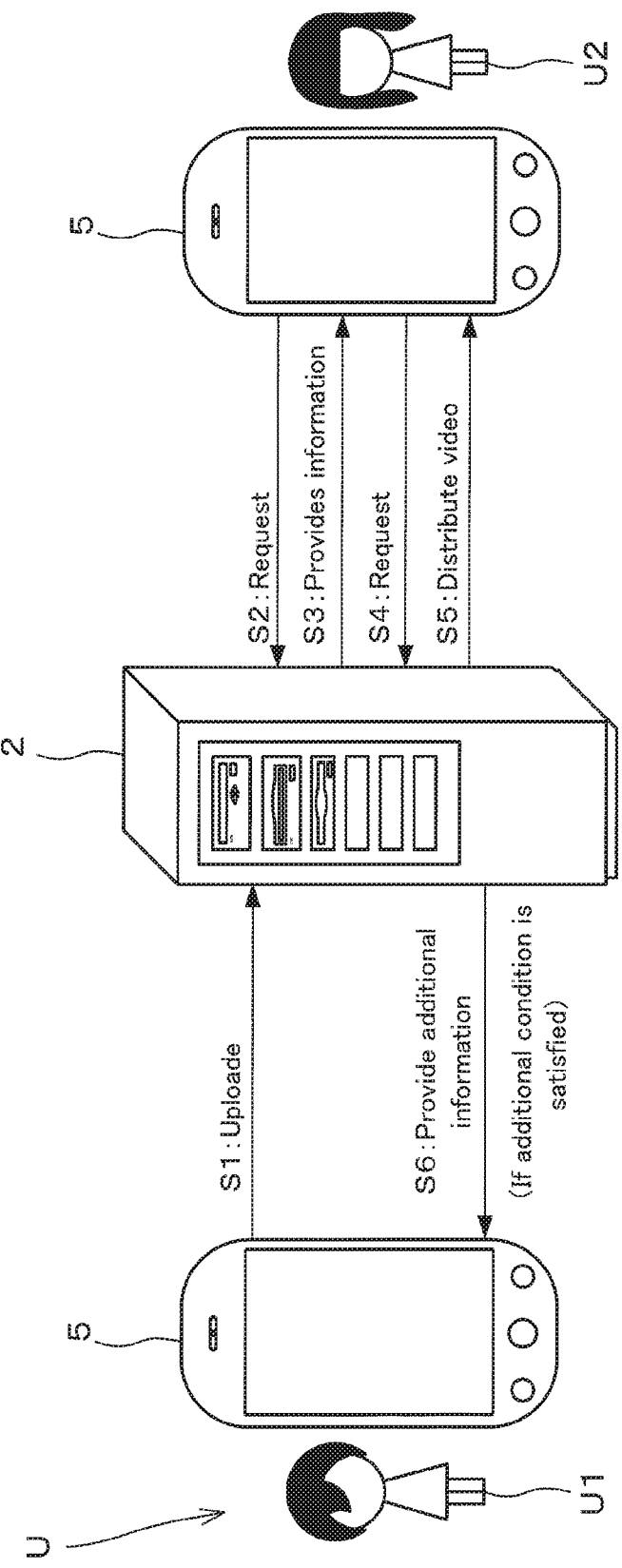
FIG. 3 is an explanatory figure for explanation of an example of a summary of the video distribution service, when a game change based upon an additional condition is added.

A summary of an example of the video distribution service will now be explained in concrete terms with reference to FIGS. 3 and 4. FIG. 3 is an explanatory figure for explanation of an example of a summary of the video distribution service when a game change on the basis of an additional condition is added. For example, the video distribution service may include processes corresponding to S1 through S6, as shown in FIG. 3. And, if an additional condition is satisfied along with viewing of a video that has been uploaded by a user U by some other user U, then additional information for adding a game change may be provided by the user terminal 5 that is being used by user U who uploaded that video, so that the game change is added to the game of that user U.

In concrete terms, for example, with the video distribution service, first, video data 18 for displaying a video may be uploaded from a user terminal 5 (S1). If, for example, the user terminal 5 is being used by a first user U1, then the subject of this uploading may be restricted to being a video related to the first user U1, or alternatively may not be restricted to being a video of this type. For example, a game video of a game played by the first user U1 may be employed as a video related to the first user U1. In other words, if for example the user terminal 5 is functioning as a game terminal for expressing a game machine function by executing an application (software) for a game, then video data 18 for displaying a game video corresponding to the game being played with the application (in the following, this is sometimes termed a "game application") may be uploaded. Moreover, for example, the user terminal 5 may execute provision, recording, and uploading of this type of game via the game application. In other words, the game application may be adapted to be capable of providing the game, of creating a video of the play of the game, and of executing uploading of video data 18 corresponding to that video.

Incidentally, uploading of a video may, for example, be performed via a video application (software) for implementing the video replay function. For example, a web browser application (hereinafter sometimes termed a "web browser") may be employed as this type of video application. In other words, video uploading may be performed via a web application that is separate from the game application for the game.

On the other hand, a user terminal 5 may request the central server 2 to distribute videos according to commands from individual users U (S2). For example, in order to identify the individual user U, information specifying a user ID that is unique for each user U may be included in this request. In concrete terms, for example, if the user terminal 5 is being employed by a second user U2 who is different from a first user U1, then, when a request is made to the central server 2 for distribution, the user terminal 5 may provide information to the central server 2 specifying the user ID corresponding to this second user U2. Moreover, if for example the user terminal 5 functions as a video display terminal by executing a video application, then this type of request may be executed via an application of this type. For example, a web browser may be employed as a video application of this type. In other words, a request for video distribution of this type may be executed via a web application that is separate from the game application. Or, alternatively, the request could also be executed via a game application.

Next, the central server 2 provides information related to the videos to the user terminal 5 that was the source of the request (S3). For example, if there are a plurality of videos, then, as this type of information, the central server 2 may provide recommendation information recommending a part of these videos to the user terminal 5. Moreover, as this type of information related to the videos, the central server 2 may also provide thumbnails (i.e. a list based upon reduced images) of these related videos that can be distributed. In this case, for example, these thumbnails of the videos may be arranged on the basis of some sorting criterion. For example, the degree of progress in the game, the game ranking, the user level, a character or the like may be employed as such a sorting criterion. In other words, for example, the central server 2 may provide thumbnails of the videos arranged on the basis of the degree of progress in the game or the like to the user terminal 5 as recommendation information.

Next the user terminal 5 may, for example, make a second request to the central server 2 so as to specifically to designate the video to be the subject of distribution (S4). In concrete terms, for example, on the basis of the result of selection among the thumbnails of the videos and so on, the user terminal 5 may request the central server 2 to distribute video data 18 of the video that has now been selected. And the central server 2 may distribute the subject video data 18 to the user terminal 5 on the basis of this type of request (S5). In other words, the central server 2 may specify video data 18 for the specific video that has been requested from the plurality of videos, and may distribute this video data 18 to the user terminal 5.

Furthermore, if an additional condition is satisfied along with viewing each video (in the case of providing an additional condition), then, for example, the central server 2 may provide additional information to the user terminal 5 of the user U, so that the game change is added to the game of that user U associated with that video which has viewed via the video data 18 (S6). For example, information about benefits that are to be conferred upon the user U or information about the user U who is to be associated may be employed as this type of additional information. In concrete terms, for example, the additional condition may be satisfied if a video that has been uploaded by the first user U1 has been viewed by the second user U2 (in other words, the additional condition may only stipulate viewing). And the central server 2 may provide information specifying the benefits to be conferred as game changes to the user terminal 5 of the first user U1, so that these benefits are added to the game played by the first user U1. For example, if a benefit such as an item possessed by an individual user U or the like is managed with the play data 19, then the granting of this type of benefit may be performed via the play data 19. In other words, the central server 2 may update the contents of the play data 19, so as to confer a benefit of this type. Also, for example, the central server 2 may employ points as a benefit of this type. In this case, the additional condition may, for example, include a requirement for a certain number of viewings (i.e., the number of times the video has been viewed), and, if the video is evaluated by users, the result of this evaluation may also be included as a requirement. In other words, the additional condition may be satisfied if the number of viewings is a predetermined number or more, or may be satisfied if the result of evaluation is a predetermined value or greater, or if the number of persons who give a high evaluation is a predetermined number or more. Furthermore, the number of points of this type that are awarded may change according to the number of viewings or the results of evaluation. And, for example, points of this type may be employed in exchange for multiple benefits that can be used in the game (such as items or the like that can be used directly in the game), prepared according to the number of points. In other words, as game changes, the central server 2 may employ indirect benefits (i.e. benefits that can be used indirectly in the game), such as points of this type and so on. Yet further, indirect benefits such as points of this type and so on may be managed with data for managing information about such benefits. In other words, indirect benefits may be conferred via such data along with the viewing of videos. As a result, indirect benefits of this type may also function as additional information. For example, the play data 19 may also be employed as data of this type. In concrete terms, for example, if points are managed with the play data 19 as benefits of this type, then the central server 2 may update the play data 19 so that the points of the play data increase along with viewing. And changes may be provided to the user terminal 5 or to the game via play data 19 of this type. In other words, additional information may be conveyed to the user via data of this type. Furthermore, this type of additional information may be associated with the type of the game. In concrete terms, when a plurality of games are provided by the user terminal 5 (or this could also be a plurality of user terminals 5), and a plurality of game videos associated respectively with those games are distributed via video data 18, then the central server 2 may determine a game corresponding to a game video that has been viewed as a requirement of an additional condition, and may convey additional information related to that game to the user who provided that game video. In other words, if there are a plurality of game videos corresponding to a plurality of games, then benefits of various types and so on such as points and the like for games of those game videos may be awarded to users who provide those videos. Alternatively, the central server 2 may provide information about the user ID corresponding to a second user U2 to the user terminal 5 as additional information, so that a setting opportunity for setting an association in the game in a friend register or the like between the first user U1 and the second user U2 (for example a screen or a display for setting a friend register or the like) is added as a game change. In concrete terms, for example, a permission opportunity may be awarded to the first user U1 as such a setting opportunity, for selecting whether or not to permit friend registration of the second user U2, or the like.

Figure 4:
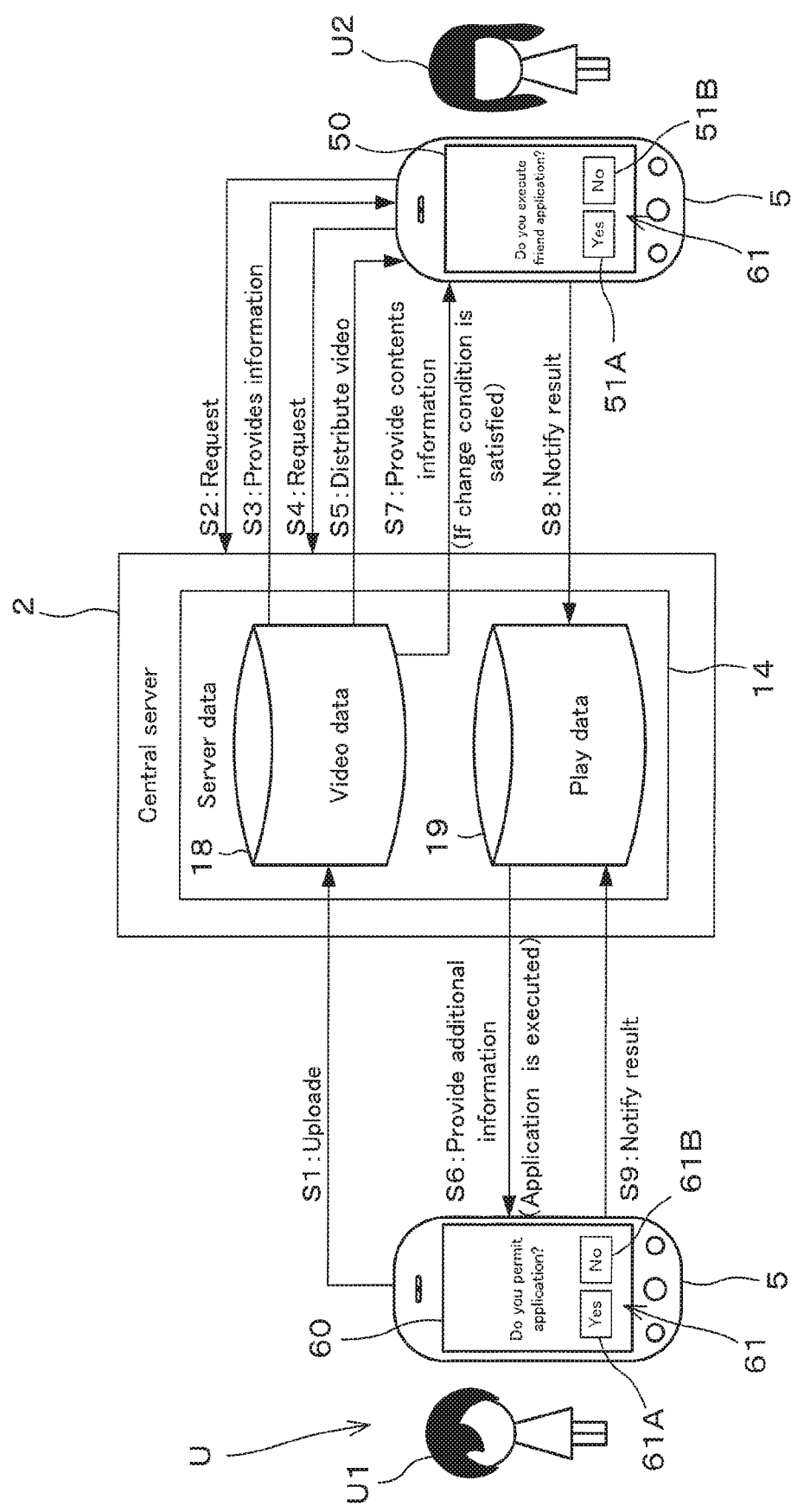
FIG. 4 is an explanatory figure for explanation of an example of the video distribution service when a terminal change based upon a change condition is added.

On the other hand, FIG. 4 is an explanatory figure for explanation of an example of a video distribution service when a terminal change based upon a change condition is added. Moreover, the example of FIG. 4 shows a case in which an association setting is employed as a terminal change. In this case, as shown in FIG. 4, steps S7 through S9 are further added, as compared to the example of FIG. 3. And via these steps, if for example a change condition has been satisfied along with viewing a video, the video distribution service may add, as a terminal change, an application opportunity for a friend application to the game of the user U who viewed that video. Moreover, along with a difference in the additional condition, a change may occur in the processes that are common with FIG. 3. For example, an additional condition may be satisfied if a friend application is made upon the opportunity for such an application. In other words, the additional condition may include the association setting as a requirement, and may be satisfied if the friend application is actually made by the user U who viewed the video. And, for example, if an application of this type is executed, then the video distribution service may add to the game of the user U who provided the video, in the processing of step S6, as a game change, a permission opportunity for selecting whether or not to allow an association setting of this type.

In concrete terms, for example, the steps from the uploading (S1) to the video distribution (S5) may be executed in a similar manner to the case in the FIG. 3 example. On the other hand, for example, after (or before) executing the video distribution (S5), the central server 2 may determine whether or not the change condition is satisfied by the user U who is the subject of this distribution, and, if the change condition is satisfied (if a change condition is provided), may provide contents information for providing a terminal change to the user terminal 5 of the recipient of this video (S7). In more concrete terms, for example, when a game video that has been uploaded by a first user U1 has been viewed by a second user U2 who has a playing record of that game, the central server 2 may provide the necessary information for displaying an application screen 50 as contents information to the user terminal 5 of the second user U2.

And, on the basis of contents information of this type, the user terminal 5 may display the application screen 50 as a terminal change along with provision of the change condition.

Furthermore, for example, the user terminal 5 may notify the central server 2 of the result of application by the user U upon an application screen 50 of this type (S8). For example, the application screen 50 may be configured to implement a friend application (or a rival application). And the application screen 50, for example, may include selection buttons 51 for selecting whether or not the application should be accepted. In other words, the application screen 50 may be used to provide an application opportunity for applying for an association setting such as a friend registration or the like.

In concrete terms, for example, as selection buttons 51 of this type, the application screen 50 may include a "YES" selection button 51A for accepting the application and a "NO" selection button 51B for refusing the application. And, as the result of the application, the user terminal 5 may notify the central server 2 of the result of selection upon these selection buttons 51A and 51B. In other words, for example, when a game video that has been uploaded by a first user U1 has been viewed by a second user U2 who has a playing record in the game, an application screen 50 may be displayed upon the user terminal 5 for selecting whether or not the first user U1 should be registered as a friend in the game. And, if the "YES" selection button 51A is selected, then information specifying this acceptance of the application (i.e., for setting of an association) may be notified to the central server 2, so that the friend application is accepted from the second user U2 to the first user U1. On the other hand, if the "NO" selection button 51B is selected, then information specifying this refusal of an application may be notified to the central server 2, so that this application is not accepted.

On the other hand, in a similar manner to the case with the FIG. 3 example, if the additional condition is satisfied, the central server 2 may provide the additional information to the user terminal 5 of the user U who provided the video that has been viewed as a requirement for this additional condition (S6). In this case, for example, after having acquired the result of application upon the application screen 50 from the user terminal 5, the central server 2 may for example determine, based upon this application result, whether or not the video satisfies the additional condition. In concrete terms, for example, the central server 2 may determine that the additional condition is satisfied if a friend application from a second user U2 who has viewed a video to a first user U1 who provided that video is made, or may determine that the additional condition is not satisfied if the friend application is not made, respectively. And if the friend application is made, in other words if the additional condition is satisfied, then the central server 2 may provide the information that is necessary for displaying a permission screen 60 as additional information to the user terminal 5 of the first user U1. Furthermore, the user terminal 5 may display the permission screen 60 as a game change along with providing the additional condition, on the basis of this type of additional information.

Furthermore, for example, the user terminal 5 may notify the central server 2 of the permission result for the user U upon this type of permission screen 60 (S9). For example, the permission screen 60 may be adapted to implement permission of friend applications (or of rival applications). And, for example, the permission screen 60 may include selection buttons 61 for selecting whether or not to allow permission. In other words, the permission screen 60 may be employed for providing a permission opportunity for selecting whether or not to permit a friend application or the like.

In concrete terms, for example, as selection buttons 61 of this type, the permission screen 60 may include a "YES" selection button 61A for permitting the application and a "NO" selection button 61B for not permitting (i.e. refusing) the application. And the user terminal 5 may notify the central server 2 of the result of selection upon these selection buttons 61A and 61B as the permission result (S9). In other words, for example, when a friend application has been made from the second user U2, a permission screen 60 may be displayed via the game application for selecting whether or not the second user U2 should be registered as a friend in the game. And, if the "YES" selection button 61A is selected, then information that this application is permitted may be notified to the central server 2, so that the second user U2 is registered as a friend of the first user U1. On the other hand, if the "NO" selection button 61B is selected, then information specifying this refusal of the application may be notified to the central server 2, so that the second user U2 is not registered as a friend of the first user U1, in other words so that such an application is not permitted. As one example, the video distribution service may be structured in this manner. Moreover, for example, in the example of FIG. 3 and FIG. 4, the first user U1 may function as the corresponding user of the present invention.

Incidentally, the application screen 50 and the permission screen 60 may, example, be displayed via either a web browser or a game application, provided that they are provided due to a game change or due to a terminal change. In concrete terms, for example, the permission screen 60 may be displayed via a web browser. And, if permission is granted on this screen, then, for example, the central server 2 may provide to the game application, as additional information, information for making the association setting in the game application the next time that the game application is started, so that the association setting is made in the game. Moreover, for example, a plurality of changes may be prepared as terminal change candidates, such as benefits, friend applications, or rival applications of the type described above or the like. And, among a plurality of changes of this type, changes selected by the user U may be employed as the actual terminal changes. In concrete terms, for example, among these benefits, friend applications, or rival applications, a change (for example, in the FIG. 4 example, a friend application) that has been selected by the first user U1 who uploaded the video (i.e. by the provider of the video) may be given to the user terminal 5 as a terminal change. Furthermore, for example, at the time of uploading a video, information specifying the result of selection by the first user U1 (i.e. the change selected among the terminal change candidates) may be provided to the central server 2 so as to correspond to that video. In other words, in step S1, along with the video data 18, information specifying the details of a terminal change that is to be associated with that video may be provided to the central server 2. The same is the case for a game change.

Next, the details of the video data 18 and the play data 19 will be explained. As described above, the video data 18 is data for displaying the video. Furthermore if, for example, along with providing change conditions or the like, a plurality of changes exist as terminal changes or the like, or if changes of this type are made to a part of the videos among the plurality of videos (i.e. if there are videos to which terminal changes or the like are to be made and also videos to which no such changes are to be made), then information for managing the details of changes of this type may be included in the video data 18.

Figure 5:
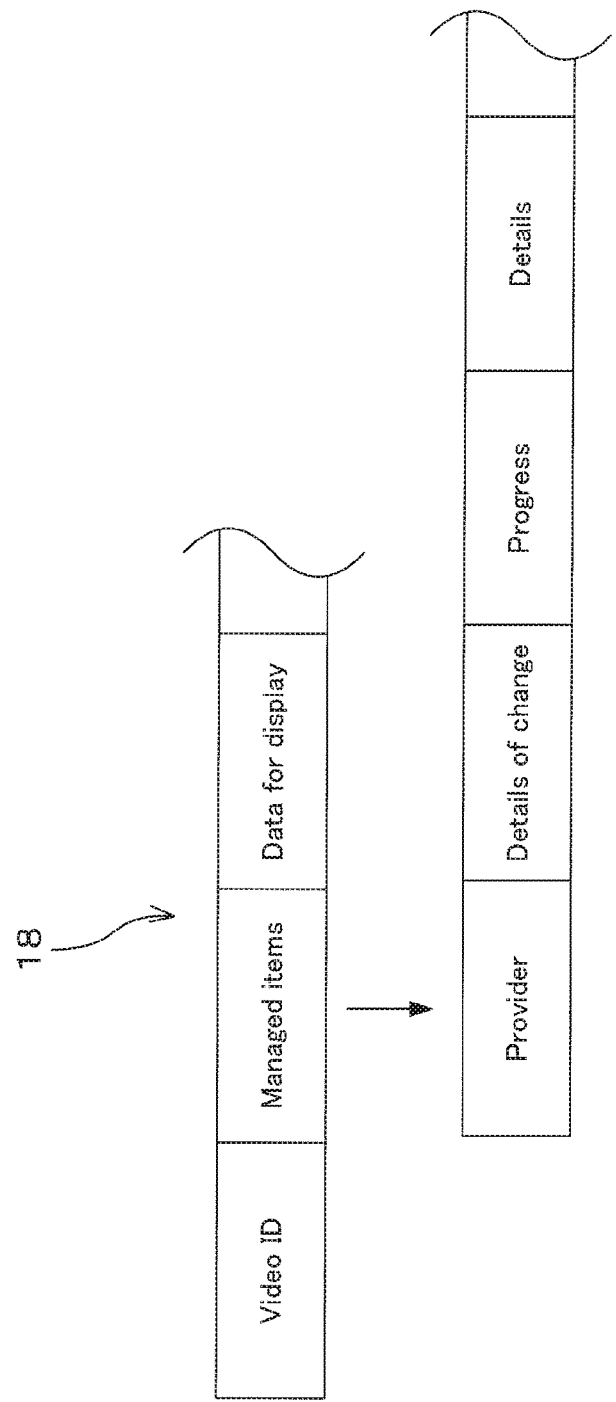
FIG. 5 is an explanatory figure for explanation of an example of the contents of video data.

FIG. 5 is an explanatory figure for explaining an example of the contents of the video data 18. As shown in FIG. 5, for example, the video data 18 may include the information items "video ID" serving as video identification information, "managed items", and "data for display". "Video ID" is an information item for identifying each of the videos. Information specifying a unique video ID for each of the videos may, for example, be employed as "video ID". And "data for display" is data that is required for causing each of the videos to be displayed upon the monitor MO. On the other hand, "managed items" is an information item for managing each of the videos. For example, "managed items" may include information specifying "provider" serving as user identification information, and information specifying "details of change" serving as contents information, "progress", and "details".

"Provider" is an information item specifying the user U who has provided each video. For example, information specifying the user ID corresponding to the user U who has uploaded each video may be used as the information item "provider". "Details of change" is an information item specifying the details of the changes to be added to the game. For example, additional information or contents information may be described as this "details of change" information. Moreover, for example, information specifying the details of a benefit (an item or points or the like) or the details of an association setting (for example, a friend application or a rival application) may be described as additional information or as contents information. And, if the video is a game video, then the information item "progress" may be used. Yet further, for example, if a numerical value that indicates the degree of progression is set as appropriate in the game, then information specifying a numerical value of this type may be used as the information item "progress". Furthermore, "details" is an information item specifying various types of characteristics of the videos, such as the characters who appear in the videos, the levels of the users U who are playing (in the case of a game video, for example), and so on. For example, as information for "detail", information about unique character IDs for each character for identifying each character, or information about numerical values that specify levels, or the like may be used. And, for example, the video data 18 may be structured as sets of records in which the above information items are described so as to be mutually associated with one another. Yet further, by including the information items "video ID" and "provider", the video data 18 may function as the video management data of the present invention.

Figure 6:
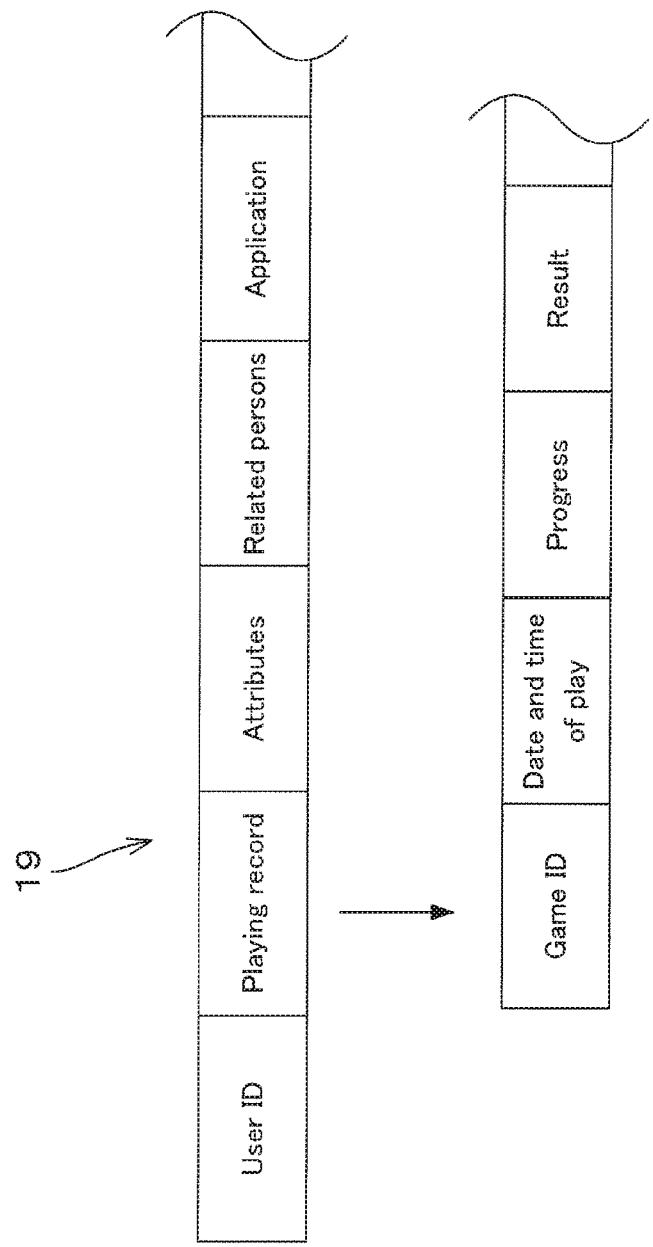
FIG. 6 is an explanatory figure for explanation of an example of the contents of play data.

Even further, as described above, the play data 19 is data for managing specific information that is unique to each user U. FIG. 6 is an explanatory figure for explanation of an example of the contents of the play data 19. As shown in FIG. 6, the play data 19 may, for example, include the information items "user ID", "playing record", "attributes", "related persons", and "application". And, for example, the information items "playing record", "related persons", and "application" may function as activity result information related to the game.

"User ID" is an information item specifying a user ID for identifying each individual user U. And "attributes" is an information item specifying attributes of each individual user U. For example, information specifying sex or age may be employed as the information item "attributes". And "related persons" is an information item specifying another user or users U with whom association is set. For example, the information item "related persons" may be employed when setting of associations for association between individual users U is permitted in the game. And an association between individual users U may be set via an association setting of this type. Moreover, for example, as described above, a friend registration or a rival registration or the like may be employed as an association setting of this type. And, for example, information specifying the user ID of another user U who is registered in a friend register of this type, or the like, may be employed as the information item "related persons". Furthermore, "application" is an information item for managing the presence or absence of an application for association setting. For example, the information item "application" may be employed when a permission opportunity for association setting is given. In concrete terms, for example, the information item "application" may include information specifying the applicant and the application target person. Yet further, the information item "application" may further include information about user IDs, specifying the applicant and the application target person (i.e. the person who is to permit the application). And this item may be used for managing granting of permission opportunities. In other words, for example, if an additional condition includes an application for association setting in its requirements, then then the information item "application" may be employed for determining whether or not the additional condition is satisfied.

On the other hand, "playing record" is an information item specifying the playing record in the game. For example, "playing record" may include information items "game ID", "date and time of play", "progress", and "result". "Game ID" is an information item specifying a unique game ID for each game, in order to identify each game when there are a plurality of games. Moreover, "date and time of play" and "result" are information items respectively specifying the date and time that the game was played, and the result at that time. On the other hand, "progress" is an information item specifying the degree of progress in the game. For example, in a similar manner to the case with the video data 18, if a numerical value that specifies the degree of progress in the mage is set as appropriate, then information specifying a numerical value of this sort may be employed as the information item "progress". Furthermore, for example, the play data 19 may be structured as sets of records in which the above information items are described so as to be mutually associated with one another.

Next, the data distribution processing, the change addition processing, and the data acquisition processing will be explained. The data distribution processing is processing for distributing videos according to requests from the user terminals 5. Furthermore, for example, the data distribution processing may be adapted to provide a terminal change to the user terminal of the recipient if a change condition is satisfied. In more concrete terms, for example, the data distribution processing may be adapted to implement processing corresponding to the steps S5 and S7 through S8 of the video distribution service shown by way of example in FIG. 4. On the other hand, the change addition processing is processing for adding a game change if an additional condition is satisfied. For example, the change addition processing may be adapted to implement processing corresponding to the steps S6 and S9 of the video distribution service shown by way of example in FIG. 4. Moreover, the data acquisition processing is processing to acquire video data 18 from a user terminal 5. For example, the data acquisition processing may be adapted to implement processing corresponding to the step S1 of the video distribution service shown by way of example in FIG. 4.

Figure 7:
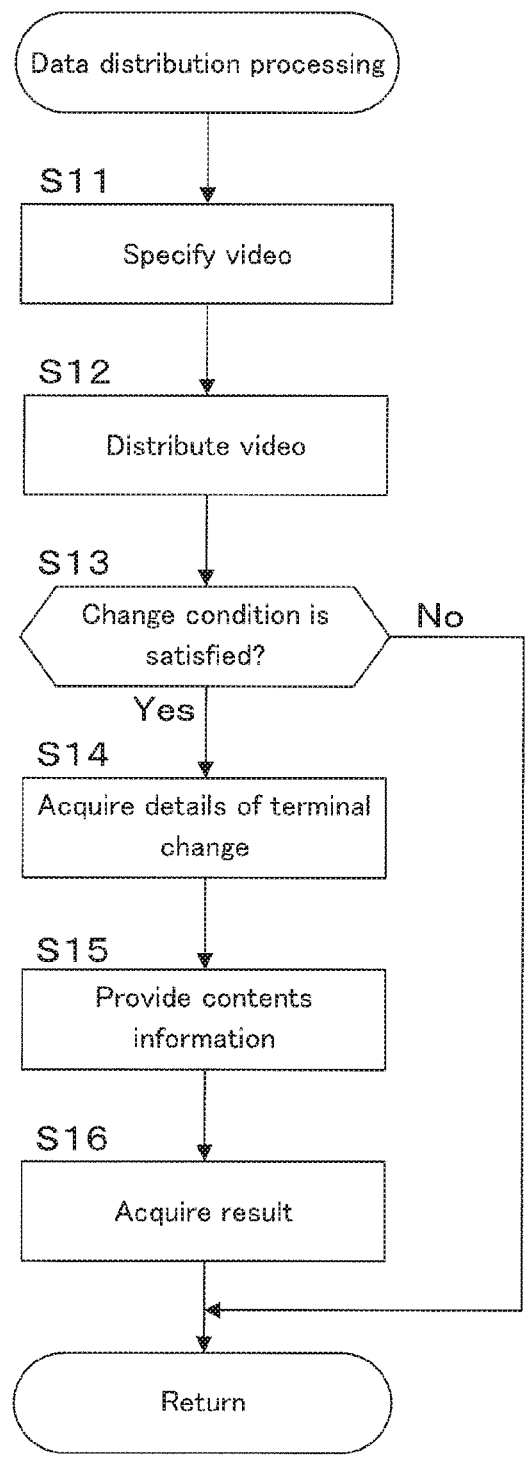
FIG. 7 is a figure showing an example of a flow chart of a data distribution processing routine.
Figure 8:
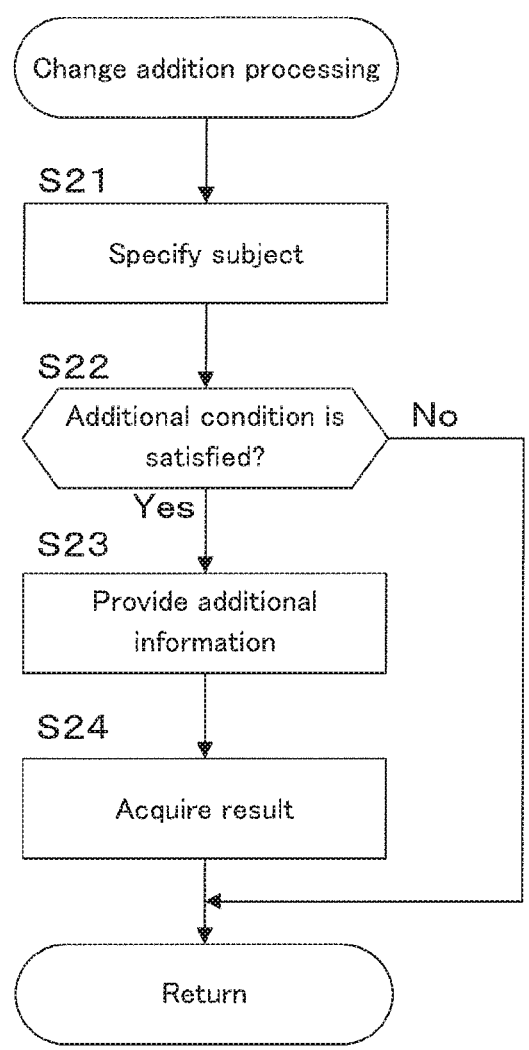
FIG. 8 is a figure showing an example of a flow chart of a change addition processing routine.
Figure 9:
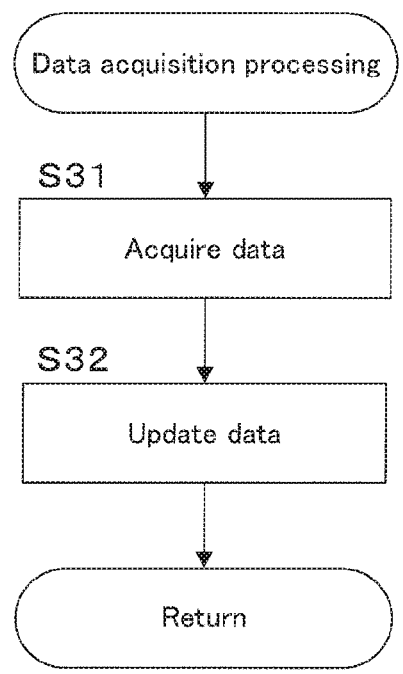
FIG. 9 is a figure showing an example of a flow chart of a data acquisition processing routine.

For example, the data distribution processing may be implemented by the control unit 10 of the central server 2 via the routine of FIG. 7, the change addition processing may be implemented via the routine of FIG. 8, and the data acquisition processing may be implemented via the routine of FIG. 9. In more concrete terms, for example, the routines of FIG. 7 through FIG. 9 may all be executed by the web service management unit 17 of the control unit 10. Incidentally, in addition to these processes, the control unit 10 of the central server 2 and the control unit 30 of the user terminal 5 may also execute various other processes of per se known types and so on, either singly or in mutual cooperation. However, detailed explanation thereof will be omitted.

FIG. 7 is a figure showing an example of a flow chart of a data distribution processing routine for implementing the data distribution processing. Moreover, the example of FIG. 7 shows a case in which a terminal change is provided to the user terminal 5 of the recipient, on the basis of a change condition. The routine of FIG. 7 may, for example, be executed each time video distribution is requested via the user terminal 5. In more concrete terms, for example, after provision of information (S3) relating to a video that is to be the subject of distribution, the routine of FIG. 7 may be executed each time distribution of the video specified on the basis of this information is requested.

When the routine of FIG. 7 is started, first in step S11 the web service management unit 17 specifies a video that is to be the subject of distribution. In concrete terms, for example, the web service management unit 17 may specify a video to be the subject of distribution on the basis of information specifying the video that is included in a request from a user terminal 5. Then in the next step S12 the web service management unit 17 distributes the video specified in step S11 to the user terminal 5 that was the source of the request. In concrete terms, for example, the web service management unit 17 may implement distribution of the video that was specified in step S11 by distributing the video data 18 for that video to the user terminal 5.

In the next step S13, the web service management unit 17 determines whether or not a change condition is satisfied. For example, if the presence or absence of a playing record is employed as the change condition, then the web service management unit 17 may implement a determination of this type on the basis of the information item "playing record" in the play data 19. In concrete terms, for example, if the video that is to be the subject of distribution is a game video, then the web service management unit 17 may determine whether or not the user U who is using the user terminal 5 that has been the source of the request, in other words the user U who is to view the game video that is the subject of distribution (for example, in the example of FIG. 4, the second user U2), possesses "playing record" information for the game corresponding to that game video. And if the result of this determination is negative, in other words if the change condition is not satisfied (for example, in the FIG. 4 example, if the second user U2 does not possess a playing record in the game that corresponds to the game video), then the web service management unit 17 skips the subsequent processing and terminates the current iteration of the routine.

On the other hand, if the result of the determination in step S13 is affirmative, in other words if the change condition is satisfied (for example if the second user U2 in the example of FIG. 4 has a playing record in the game corresponding to the game video), then the web service management unit 17 advances the flow of control to step S14. In step S14, the web service management unit 17 acquires information specifying the details of the terminal change to be provided to the game of the user U who was the source of the request, accompanying provision of the change condition. For example, if the details of the terminal change are managed via the information item "details of change" in the video data 18, then, based upon the user ID included in the request, the web service management unit 17 may acquire information specifying the details of the terminal change by acquiring information from the video data 18 about the "details of change" of the subject user U.

Next in step S15 the web service management unit 17 provides the contents information to the user terminal 5 that was the source of the request. For example, as the contents information, the web service management unit 17 may provide the information specifying the details of the terminal change that was acquired in step S14, in other words the information item "details of change", to the user terminal 5. In concrete terms, for example, if information specifying a friend application is specified as "details of change", then the web service management unit 17 may provide information that is required for displaying an application screen 50 (for example, information commanding the provision of such an application screen 50, and/or information specifying a user ID that indicates a video provider, and so on) to the user terminal 5 as contents information, so that this application screen 50 is displayed upon the user terminal 5.

In the next step S16, the web service management unit 17 acquires the result of providing the change on the basis of the contents information. For example, as an provision result of this type, the web service management unit 17 may acquire a result of a friend application, in other words a result of selection upon the selection buttons 51 of the application screen 50. In more concrete terms, as the provision result, the web service management unit 17 may, for example, acquire information specifying the selection button 51 that has been selected from among the "YES" selection button 51A and the "NO" selection button 51B. Moreover, if the information item "application" is being managed with the play data 19, then the web service management unit 17 may, for example, update the details of the play data 19 in step S16 so as to reflect the result of this acquisition. And, when the processing of step S16 has been completed, the web service management unit 17 terminates the current iteration of the routine.

According to the routine of FIG. 7, the video data 18 of the video corresponding to the request is distributed to the user terminal 5 that was the source of the request. Furthermore, for example, if a change condition is satisfied along with the viewing of this video that is the subject of distribution, then a terminal change is provided to the user terminal 5 of the user U who has viewed that video. In concrete terms, for example, when it is the case that the user U who has viewed the game video which is the subject of distribution has played the game of this game video, then the application screen 50 is displayed upon the user terminal 5 of that user U. And an application opportunity for making a friend application is provided via that application screen 50. In other words, for example, processing corresponding to the steps S5 and S7 through S8 of the example of FIG. 4 is implemented.

On the other hand, FIG. 8 is a figure showing an example of a flow chart of a change addition processing routine for implementing the change addition processing. For example, the routine of FIG. 8 may be executed whenever requested from a user terminal 5. Furthermore, for example, the user terminal 5 may make a request of this type each time the game application is started (i.e. is used). In other words, for example, the routine of FIG. 8 may be executed each time the game application is started upon a user terminal 5.

When the routine of FIG. 8 is started, first in step S21 the web service management unit 17 specifies the user U who is to be the subject. For example, the game application may be adapted so as to request input of a user ID when the game application starts. Moreover, the user terminal 5 may request the routine of FIG. 8 to include information about the user ID of this type. And, for example, the web service management unit 17 may execute the routine on the basis of user ID information of this type included in the request from the user terminal 5. Alternatively, the web service management unit 17 may request the user terminal 5 to provide a user ID.

Next in step S22 the web service management unit 17 determines whether or not the additional condition is satisfied. For example, if a playing record is employed as a requirement of the additional condition, then the web service management unit 17 may determine that the additional condition is satisfied if the game video that was uploaded by the specified user U in step S21 (for example, in the example of FIG. 4, by the first user U1) has been viewed by a user U who possesses a playing record in that game (for example, in the example of FIG. 4, the second user U2). Moreover, for example, if an association setting is employed as a requirement of an additional condition, then the web service management unit 17 may determine whether or not the additional condition is satisfied on the basis of the information "application" included in the play data 19 of the user U identified in step S21. In concrete terms, for example, if the information item "application" in the play data 19 indicates that there is an application, in other words if an application for association setting on the friend register or the like is being executed via the application screen 50, then the web service management unit 17 may determine that the additional condition is satisfied. On the other hand, for example, if no information item "application" indicating the presence of an application (for example, indicating absence of an application) is present in the play data 19, in other words if no application for association setting on the friend register or the like is being executed via the application screen 50 (for example, this may include the case when the game video is not being viewed, and the case when, even though the game video is being viewed, the user does not have any playing record in the game), then the web service management unit 17 may determine that the additional condition is not satisfied. And if the result of determination is negative, in other words if the additional condition is not satisfied, then the web service management unit 17 skips the subsequent processing and terminates the current iteration of the routine.

Incidentally, for example, if the additional condition is satisfied along with viewing the video, then, instead of "application", the play data 19 may include information for managing whether or not viewing of this type has been performed. In other words, such a requirement may be managed with suitable data, according to the requirements of the additional condition. And in step S21, on the basis of data of this type, it is determined whether or not the additional condition is satisfied.

On the other hand, if the result of the determination in step S22 is affirmative, in other words if the additional condition is satisfied, then the web service management unit 17 advances the flow of control to step S23. In step S23, the web service management unit 17 provides additional information to the user terminal 5 that was the source of the request (for example, to the user terminal 5 that started the game application). In concrete terms, for example, as additional information, the web service management unit 17 may provide information that is required for displaying a permission screen 60 to the user terminal 5 (for example, information commanding the provision of the permission screen 60, information about the user ID specifying the applicant, and so on), so that this permission screen 60 is displayed upon the user terminal 5.

In the next step S24, the web service management unit 17 acquires an additional result of a game change on the basis of the additional information. For example, as such an additional result, the web service management unit 17 may acquire a permission result with respect to a friend application, in other words a result of selection upon the selection buttons 61 upon the permission screen 60. In more concrete terms, as the additional result, the web service management unit 17 may, for example, acquire information specifying which one of the selection buttons 61 has been selected, among the "YES" selection button 61A and the "NO" selection button 61B. Furthermore, for example, if the information item "related persons" is being managed with the play data 19, then the web service management unit 17 may update the details of the play data 19 in step S16, so as to reflect this result that has been acquired. In other words, for example, if the "YES" selection button 61A on the permission screen 60 has been selected, then the web service management unit 17 may update the contents of the play data 19 in step S24, so that the result of selection in the current iteration of the routine is reflected in the information item "related persons" of the play data 19 (in the case of FIG. 4, for example, so that information specifying the user ID corresponding to the second user U2 is added to the information item "related persons" of the first user U1). And, when the processing of step S24 has been completed, the web service management unit 17 terminates the current iteration of the routine.

According to the routine of FIG. 8, if for example the additional condition is satisfied along with viewing of the video, then a game change is added to the game of the user U who uploaded that video. In concrete terms, for example, when a friend application is made from the user U who viewed the game video, the additional condition is satisfied, and, along with providing this additional condition, as a game change, a permission screen 60 is displayed upon the user terminal 5 of the user U who provided that game video. And a permission opportunity for selecting whether or not to permit that friend application is provide via a permission screen of such a type. In other words, for example, processing corresponding to the steps S6 and S9 of the example of FIG. 4 is implemented.

Furthermore, FIG. 9 is a figure showing an example of a flow chart of a data acquisition processing routine for implementing data acquisition processing. For example, the routine of FIG. 9 may be executed each time data transmission is requested from a user terminal 5. When the routine of FIG. 9 is started, first, the web service management unit acquires the video data 18 that is to be the subject of transmission from the user terminal 5. Furthermore, if the terminal change is selected from among a plurality of candidates, then in step S31, along with the video data 18, the web service management unit 17 acquires information corresponding to the terminal change selected by the user U from the user terminal 5, as details of the terminal change that is to be associated with the video of this video data 18.

Next in step S32 the web service management unit 17 updates the video data 18, so that the details acquired in step S31 are reflected. In concrete terms, for example, by adding the video data 18 acquired in step S31 and so on, the web service management unit 17 updates the details of the already existing video data 18, so that video corresponding to this video data 18 is displayed. Furthermore, for example, when the details of the terminal change are acquired in step S31, the web service management unit 17 may update the details of the already existing video data 18 so that the details of the terminal change are reflected in "details of change". For example, if the video data 18 includes a plurality of data sets 18 respectively corresponding to a plurality of videos, then the web service management unit 17 may implement this type of updating by adding the video data 18 acquired in step S31 ("details of change" may be included). In other words, this type of updating may be implemented by adding video data 18 corresponding to the new video. And, when the processing of step S32 is completed, the web service management unit 17 terminates this iteration of the routine. Due to this, video data 18 corresponding to each of the videos is uploaded from the user terminal 5. Furthermore, if a plurality of changes have been prepared as terminal changes, then information corresponding to a change selected from among those changes by the provider of the video is acquired from the user terminal 5. In other words, the processing of the step S1 in the example of FIG. 4 is implemented.

As explained above, according to this embodiment, when a change condition that includes viewing of a video in the requirements is satisfied, a terminal change is provided to the user terminal 5 of the user who viewed that video. Due to this, it is possible directly to associate viewing of videos with terminal changes. In concrete terms, for example, in the example of FIG. 4, the application screen 50 for setting an association is displayed as a terminal change upon the user terminal 5 of the second user U2 who has viewed the video according to the provision of the change condition. And, due to this, it is possible to shorten the procedure for association setting, as compared to a case in which an application of this sort is required separately. Because of this, as compared to a case in which no such application screen 50 is provided, it is possible to implement setting of an association more easily, so that it is possible further to promote viewing of videos.

Furthermore, if game-related changes are employed as terminal changes, then it is possible to associate viewing of videos directly with games. In concrete terms, for example, if a game-related benefit is given along with viewing a game video, then it is also possible to promote the utilization of that game. Moreover, for example, if along with the viewing of a game video, an application opportunity is given for friend registration or the like in the game, then it is possible to excite the interest of the user in the game via this type of related setting. In particular, if friend registration in the game and so on is executed via a game application, then it is possible to promote the utilization of the game application. In other words, it is possible to increase the use of the game application. As a result, by employing terminal changes of this type, it is also possible to link viewing of the videos with promotion of utilization of the games.

Yet further, when an additional condition is employed in the video distribution service, if the additional condition is satisfied along with viewing a video, then additional information is provided for adding a game change to the user U who is associated with that video by the video data 18. Due to this, it is possible directly to associate the viewing of each video with the game of a user U other than a viewer of the video via the video data 18. In concrete terms, when for example a game video is viewed, it is possible to award points for adding a game change to the game of the user U who provided that game video such as a benefit and so on. In other words, it is possible to add a game change such as a benefit or an opportunity for setting an association (including a permission opportunity for an application) or the like to a game of such a user via the additional information. Due to this, it is possible further to promote the provision of the game, as compared to a case in which this type of additional information or game change is not added.

In the embodiment described above, by executing the routine of FIG. 7, the control unit 10 of the central server 2 functions as the contents information provision unit of the present invention. Moreover, by executing the routine of FIG. 9, the control unit 10 of the central server 2 functions as the data acquisition unit of the present invention. And, by executing the routine of FIG. 8, the control unit 10 of the central server 2 functions as the information provision unit of the present invention. In a similar manner, the control unit 10 of the central server 2 functions as the user specification unit of the present invention by executing the processing of, for example, the step S21 of the routine of FIG. 8 or the step S16 of the routine of FIG. 7 (when a user is specified in order to update information that is employed for determination of provision of additional information, such as information about "application" in the play data 19, or the like). On the other hand, by storing the video data 18, the storage unit 11 of the central server 2 functions as the distribution data storage unit and as the management data storage unit of the present invention.

The present invention is not limited to the embodiment described above; it may be varied as appropriate. For example, in the embodiment described above, the user terminals 5 function both as video display terminals and as game terminals, according to differences in their software. However, the present invention is not limited to this type of form. For example, the user terminals 5 may be adapted to function as video display terminals or as game terminals, according to differences in their hardware. In other words, for example, it would be possible for two user terminals 5 that are embodied as a personal computer and as a tablet to function respectively as a video display terminal and as a game terminal. Furthermore, for example, apart from the user terminals 5, commercial game machines (for business use) that enable users to play games in a predetermined range for payment or for free may be connected to the central server 2 via the network 3 as game terminals. Moreover, in this case, game machines of this type may also be employed as dedicated game terminals.

In the following, examples of the present invention are described that are obtained from the details described above. Incidentally, in order to facilitate understanding of the present invention, reference symbols in parentheses that refer to the appended figures are supplemented in the following explanation, but the present invention is not thereby to be considered as being limited to the embodiments shown in the figures.

The server device of the present invention is a server device (2) that comprises a computer (10) having a distribution data storage unit (11) that stores data for distribution (18, 19) to be distributed to a requesting terminal (5) connected via a network (3), and that distributes the data for distribution to the requesting terminal according to a request from the requesting terminal, and wherein the computer serves as: a management data storage unit (11) that, when the requesting terminal includes a video display terminal (5) that is employed for displaying videos so that video data (18) for displaying videos functions as the data for distribution, stores video management data (18) in which user identification information for identifying individual users (for example "provider") and video identification information (for example the video IDs) for identifying videos are described in mutual association; a user specification unit (10) that, if an additional condition that includes a requirement for viewing a video is satisfied, specifies, on the basis of the video management data, a corresponding user (U1) who corresponds via the user identification information to a video that has been viewed via the video display terminal due to the additional condition having being satisfied; and an information provision unit (10) that, when the requesting terminal includes a game terminal (5) that provides a game, provides to the corresponding user, additional information for adding a game change to the game, on the basis of the result of specification by the user specification unit.

According to the present invention, if the additional condition is satisfied along with viewing a video, additional information is provided for adding a game change to the user who is associated with that video by the video management data. Due to this, via the video management data, it is possible directly to associate viewing of the videos with the games of users other than the viewer of the video. In concrete terms, for example, when a video has been viewed, it is possible to give points for adding game changes to the game of the user who provided that video such as benefits or the like. Due to this it is possible further to promote the provision of videos, as compared with the case in which this type of additional information is not provided. Incidentally, the term "server device" of the present invention is not limited to a single physical server device; it may include a single logical server device built from a server group that consists of a plurality of physical devices. In concrete terms, the server device of the present invention may, for example, include a server device for video to which a requesting terminal is connected that functions as a video display terminal, and a game server device to which a requesting terminal is connected that functions as a game terminal. And the server device for video and the game server device may also be physically separate server devices. In other words, the server device of the present invention may be built from a server group that includes a plurality of physical devices that have separate functions of this sort.

Various types of game-related change may be employed as game changes. For example, giving an application opportunity such as friend registration or the like for setting an association with a user who has viewed the video may be employed as a game change. Alternatively, benefits of various types related to the game (such as benefits that advantageously contribute to progression of the game, such as the awarding of points or the like, or decorative ornaments that are rare) may be awarded as game changes. In concrete terms, for example, as one aspect of the server device of the present invention, a setting opportunity (50, 60) for setting an association between users may be employed as a game change, and the information provision unit may provide, to the corresponding user, additional information for giving of the setting opportunity, so that the setting opportunity is given in the game played by the corresponding user. Alternatively, in one aspect of the server device of the present invention, a benefit of operating advantageously in the game may be employed as the game change, and the information provision unit may provide additional information for giving the benefit to the corresponding user, so that the benefit is given in the game played by the corresponding user. Furthermore, when the game includes a plurality of games and a plurality of game videos that are respectively associated with the plurality of games are displayed by the video data, then the information provision unit may determine a game corresponding to a game video, among the plurality of games, that has been viewed as a requirement of the additional condition, and may provide to the corresponding user, additional information for adding the game change to the game.

Moreover, conditions of various types may be employed as additional conditions, provided that a requirement to view a video is included. For example, an additional condition may be satisfied along with viewing of a video. In other words, the additional condition may include only a requirement to view a video. Or the additional condition may also include some other requirement. For example, specific information that is intrinsic to each user (such as an attribute of the user or a playing record of the user or the like) may be employed as such another requirement. Furthermore, for example, information of the playing record among the specific information may be employed as such another requirement. In concrete terms, for example, as an aspect of the server device of the present invention, the additional condition may be satisfied when each game video has been viewed by a user (U2) who has a playing record in the game corresponding to that game video, and the user specification unit may specify a user who provided each game video as the corresponding user.

On the other hand, a non-transitory computer readable storage medium according to the present invention is a non-transitory computer readable storage medium storing a computer program (15) that is adapted to cause the computer (10) having the distribution data storage unit and the management data storage unit to function as the units of the server device described above. By executing the computer program of the present invention, it is possible to implement the server device of the present invention.

The invention claimed is:

1. A server device that comprises a computer having a distribution data storage that stores data for distribution to be distributed to a requesting terminal connected via a network, and that distributes the data for distribution to the requesting terminal according to a request from the requesting terminal, and wherein the computer comprises a microprocessor configured to:
   when the requesting terminal includes a video display terminal that is employed for displaying videos so that video data for displaying videos functions as the data for distribution, store, in a management data storage, video management data in which user identification information for identifying individual users and video identification information for identifying videos are described in mutual association;
   in response to an additional condition that includes a requirement for viewing a video being satisfied, specify, on the basis of the video management data, a corresponding user who corresponds via the user identification information to a video that has been viewed via the video display terminal due to the additional condition having being satisfied; and
   when the requesting terminal includes a game terminal that provides a game, provide to the corresponding user, additional information for adding a game change to the game, on the basis of the result of specification, wherein, when the game includes a plurality of games and a plurality of game changes corresponding to the plurality of games respectively, and a plurality of game videos that are respectively associated with the plurality of games are displayed by the video data, the microprocessor is further configured to determine a game corresponding to a game video, among the plurality of games, that has been viewed as the requirement of the additional condition, and provide to the corresponding user, the additional information for adding a game change corresponding to the game.

2. The server device according to claim 1, wherein:
   a setting opportunity for setting association between individual users is employed as the game change; and
   the microprocessor provides, to the corresponding user, the additional information for giving the setting opportunity, so that the setting opportunity is given in the game played by the corresponding user.

3. The server device according to claim 1, wherein:
   a benefit of operating advantageously in the game is employed as the game change; and
   the microprocessor provides the additional information for giving the benefit to the corresponding user, so that the benefit is given in the game played by the corresponding user.

4. The server device according to claim 1, wherein:
   the additional condition is satisfied when each game video has been viewed by a user who has a playing record in the game corresponding to that game video; and
   the microprocessor specifies a user who provided each game video as the corresponding user.

5. A non-transitory computer readable storage medium storing a computer program which, when executed by the computer having a distribution data storage and a management data storage, causes the computer to perform the following operations:
   when the requesting terminal includes a video display terminal that is employed for displaying videos so that video data for displaying videos functions as the data for distribution, storing video management data in which user identification information for identifying individual users and video identification information for identifying videos are described in mutual association;
   in response to an additional condition that includes a requirement for viewing a video being satisfied, specifying, on the basis of the video management data, a corresponding user who corresponds via the user identification information to a video that has been viewed via the video display terminal due to the additional condition having being satisfied; and
   when the requesting terminal includes a game terminal that provides a game, providing to the corresponding user, additional information for adding a game change to the game, on the basis of the result of specification, wherein, when the game includes a plurality of games and a plurality of game changes corresponding to the plurality of games respectively, and a plurality of game videos that are respectively associated with the plurality of games are displayed by the video data, a game is determined that corresponds to a game video, among the plurality of games, that has been viewed as the requirement of the additional condition, and the additional information for adding a game change corresponding to the game is provided to the corresponding user.

* * * * *